July 10, 1951
R. S. SENSEMAN
2,559,681
LOCKING LATCH HANDLE
Filed Aug. 12, 1947
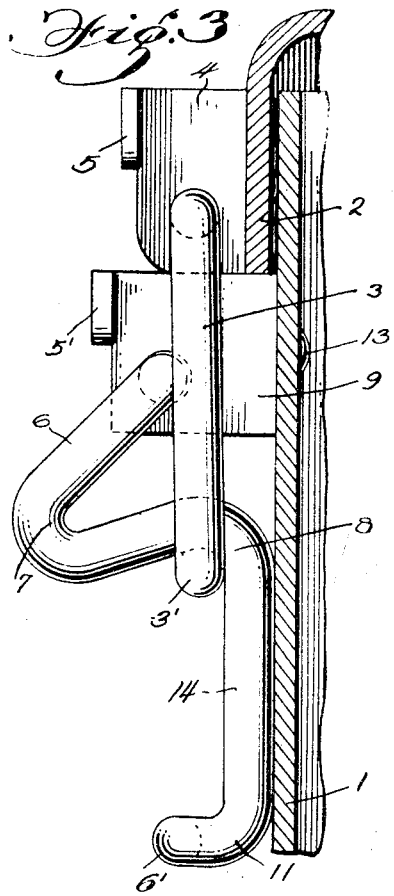
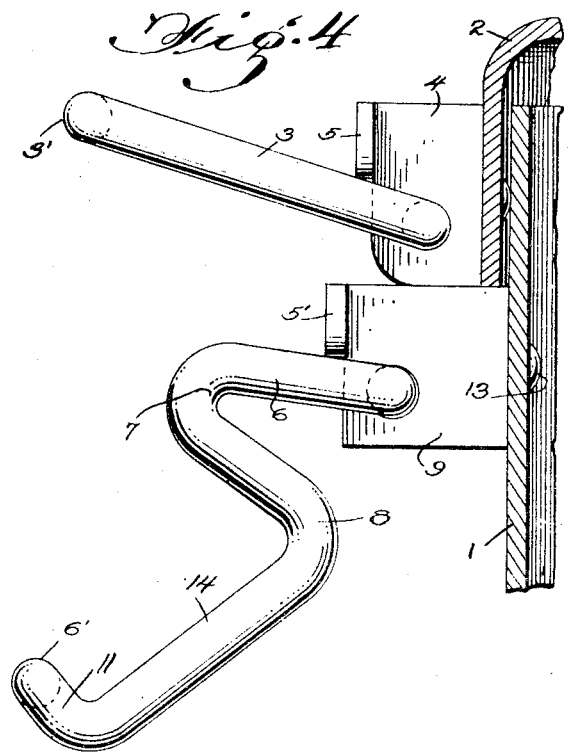
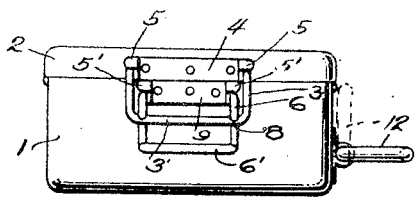
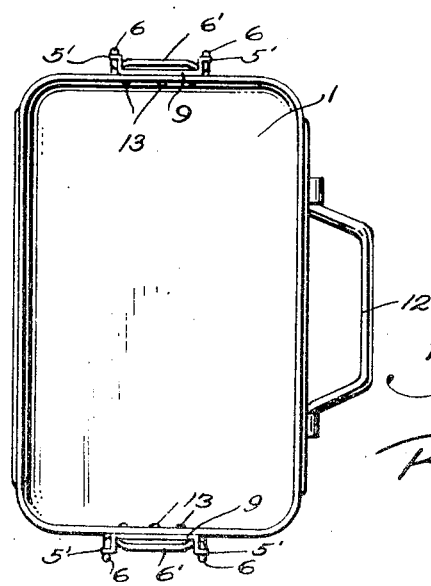
INVENTOR.
R. S. Senseman
BY
W. J. Eccleston,
ATTORNEY Patented July 10, 1951

2,559,681

UNITED STATES PATENT OFFICE 2,559,681

LOCKING LATCH HANDLE

Ronald S. Senseman, Takoma Park, Md.

Application August 12, 1947, Serial No. 768,253

8 Claims. (Cl. 220—56)

(Granted under the act of March 3, 1883, as amended April 30, 1928; 370 O. G. 757)

The invention described herein, if patented, may be manufactured and used by or for the Government for governmental purposes without the payment to me of any royalty thereon.

This is a continuation-in-part of my copending application Serial No. 554,135, filed September 14, 1944, now abandoned.

This invention relates to a combined toggle clamp and handle system wherein the component parts serve the dual purpose of functioning as handles and as clamps.

A specific object of my invention is to provide bails for a container and its lid, as for example a case for a gasoline cooking stove, which case can be used as a cooking pot and which cover can be used as a griddle or frying pan, the bails acting as handles at each end of the container and lid when open, and which bails will cooperate as over-center toggle locking clamps when it is desired to close and fasten the container for transportation or storage.

An object of my invention is to provide a two-part toggle clamp, which parts will serve as an over-center fastening device when closed and which will serve as independent handles when opened.

A further object of my invention is to provide handles for a container and its cover, which handles are readily constructed, light and serviceable, and which will serve as a toggle clamp to hold the parts together when it is so desired.

Another object of my invention is to provide bent wire handles for a container and its cover, which will serve as normal C-shaped wire handles but which will also serve as the lever arms of an invert over-center toggle when it is desired to hold the parts together.

Yet another object of this invention is an arrangement of parts to limit the pivotal movement of the handles when they are disengaged from each other.

It is also an object of this invention to provide locking latch handles of generally improved construction whereby the handles will be simple, durable and inexpensive in construction, as well as convenient, practicable, serviceable and efficient in use.

A further object of this invention is an improved seat for the lid of a container.

With the foregoing and other objects in view, which will appear as the description proceeds, the invention resides in the combination and arrangement of parts and in the details of construction herein described and claimed; it being understood that various changes in form, proportion, and details of construction may be made within the scope of the claims without departing from the spirit or sacrificing any advantages of the invention. For a complete disclosure of the invention a detailed description thereof will now be given in connection with the drawings forming a part of the specification, wherein Figure 1 is a top view of a container body showing locking handles at each end;

Figure 2 is a front view of the container and cover showing the locking handles in locked position;

Figure 3 is an enlarged side view showing the cover clamped on the container; and Figure 4 is an enlarged side view corresponding to Figure 3, but showing the handles in disengaged position.

In these drawings the numeral 1 designates a container or casing having a cover 2, both of which are provided with locking toggle handles. Normally, one set of the handles is provided at each end, although of course a single set could be used with some other retaining means at the other end, or three or more sets can be used providing a multiplicity of handles and clamps where needed or desired for large or non-rectangular containers. Two differently shaped bails are used. The bail or hasp 3 upon the lid is a square C-type handle pivoted on a support, which is a shoulder lug 4 attached to the cover as by rivets or other convenient fastening means. This lug is provided with ears 5 to hold the bail in nearly horizontal position when the latter is serving as a handle. The horizontal portion 3' of the hasp bail 3 is in a continuous substantially straight line whose length corresponds to at least the width of a human hand, so that it may serve as a handle when it is disengaged. The lower bent member or lever bail 6 appears as a simple square C when viewed from the front, but possesses two S-shaped side portions, each side portion having two points of inflection, in a plane perpendicular to the axis of its pivots, the point 7 being the apex of a spring portion doubled upon itself at an acute angle to give resilience to the over-center toggle action, the second point of inflection or elbow 8 serving as a socket which receives the hasp bail 3, and thus forms the third hinge point. The lever 6 is pivoted from a shoulder lug 9, shorter than lug 4, on the container, which shoulder lug is also provided with ears 5' to limit the movement of the lever bail when the latter is serving as a handle. These shoulder clips may each be bent from a single piece of metal, with integral ears and drill holes for the bails, the ears serving to hold the bails in nearly horizontal position when they are used as handles. The shoulder lug 9 is attached by rivets 13, or otherwise fastened to the container, or cover. As shown in the drawings, the spacing of the hinges and length of the lugs is such that the lid rests firmly upon the upper face of shoulder lug 9 when closed, shoulder lugs 4 and 9 being in aligned position when the lid or cover is in place on the container; the length of hasp bail 3 being just sufficiently short of the normal center-to-center length of the hinge hole to socket 6 that the lever bail is sprung at 7 sufficiently to give a firm clamping action. The location of the three pivot points is such that when the lever rests against the container, as shown in Figure 3, the center pivot, or hinge in lug 9, is outside the line connecting the other two pivot points, so that in closing, the lever must be forced over center, and as a result the spring tends to hold the toggle shut when once closed, as is usual in the over-center style of toggle clamps.

Obviously, the exact proportions of the members may be changed, as well as the details of the spring design, to fit in with the proportions of the object on which the locking handle is being used. Various proportions may be used and will function provided that the over-center relationship of the pivot points exists and that sufficient spring is provided in the lever so that any wear can be taken up, without interfering with the clamp action when forced over center. Some of the spring action may take place in other locations, depending upon the chosen bend of the wire; for example, a complete loop may be substituted for the first inflection. The size of wire chosen is such that the clip is as tight as desired without permanently deforming the parts; i. e., the heavier wire will give a firmer clamp, but at the same time a greater length of spring must be allowed to prevent straining the spring wire beyond its elastic limit.

As illustrated, the lower latch has a further inflection 11 in the lower center portion so that the handle is set out from the container whereby it may be readily grasped by a human hand when the side portions are lying flat against the container body in locked position. That portion 6' of the lever bail which lies between the side portions in a plane parallel to the handle portion of hasp bail 3 is also continuous and substantially straight; it is of a length corresponding to the width of a human hand, but shorter than the length of the hasp bail so that it may be inserted through the latter to lock the hasp bail and lever bail together. Socket portions 8 of the lever bail terminate as abutments 14, preferably straight, which lie against container 1 when hasp bail and lever bail are in interlocked position; the abutments 14 limit the inward movement of the lever bail for the purpose of retaining the hasp bail 3 in locked over-center relation with the lever bail when the two are interengaged.

A side handle 12 is provided (as shown) for the container to enable it to be conveniently carried when closed.

The specific embodiment shown is a case for a gasoline stove for field camping, in which the container holds a gasoline stove when packed for carrying. When the stove is in use, the container serves as a cooking pot and the lid as a frying pan or griddle as needed. The ears on the hinge clip are particularly useful for preventing movement of the bails substantially beyond the horizontal position when used as handles. When it is desired to lock the case for moving, the handles are locked together as toggle clamps or latches which serve to keep the case tightly closed; no additional parts are required, and an increase in weight is therefore avoided. The saving in weight and volume thus effected is particularly important in apparatus carried on the back; a saving in the number of parts is always desirable in military equipment. Obviously, the locking latch handles may be used on other containers and for other purposes. Further, the assembly may be inverted so that the levers are on the upper part and the simple bails on the lower, clamping then being upward instead of downward. Other changes may be made without departing from the essence of the invention as set forth in the annexed claims.

I claim:

1. A container comprising a body; a cover; a shoulder projecting from said body; a shoulder projecting from said cover, said second-named shoulder being aligned with said first-named shoulder when said cover is in position on said body; a hasp bail pivoted to one of said shoulders, said hasp bail having a continuous substantially straight portion and being adapted to serve as a handle when disengaged; and a lever bail having a continuous substantially straight portion and being adapted to serve as a handle when disengaged, said lever bail also having two parallel side portions disposed in a plane normal to said continuous substantially straight portion, each of said side portions pivotally engaging said first-named shoulder and being bent at an acute angle to provide a spring portion and an elbow portion constituting a socket for seating and releasably holding said hasp bail in over-center relationship, and an abutment portion connecting said elbow portion to said straight portion, said abutment portion bearing against said body when said lever bail engages said hasp bail; said first-named shoulder having an upper face serving as a seat for said cover when said hasp bail and said lever bail are interengaged.

2. A container comprising a body; a cover; a shoulder projecting from said body; a shoulder projecting from said cover, said second-named shoulder being aligned with said first-named shoulder when said cover is in position on said body; a hasp bail pivoted to one of said shoulders, said hasp bail having a continuous substantially straight portion and being adapted to serve as a handle when disengaged; and a lever bail having a continuous substantially straight portion and being adapted to serve as a handle when disengaged, said lever bail also having two parallel side portions disposed in a plane normal to said continuous substantially straight portion, each of said side portions pivotally engaging said first-named shoulder and being bent at an acute angle to provide a spring portion and an elbow portion constituting a socket for seating and releasably holding said hasp bail in over-center relationship; said first-named shoulder having an upper face serving as a seat for said cover when said hasp bail and said lever bail are interengaged, and at least one of said shoulders being equipped with means projecting into the path of the bail pivoted to said shoulder so as to limit the pivotal movement of said bail.

3. A container comprising a body; a cover; a shoulder projecting from said body; a shoulder projecting from said cover, said second-named shoulder being aligned with said first-named shoulder when said cover is in position on said body; a hasp bail pivoted to one of said shoulders, said hasp bail having a continuous substantially straight portion and being adapted to serve as a handle when disengaged; and a lever bail having a continuous substantially straight portion and being adapted to serve as a handle when disengaged, said lever bail also having two parallel side portions disposed in a plane normal to said continuous substantially straight portion, each of said side portions pivotally engaging said first-named shoulder and being bent at an acute angle to provide a spring portion and an elbow portion constituting a socket for seating and releasably holding said hasp bail in over-center relationship; said first-named shoulder having an upper face serving as a seat for said cover when said hasp bail and said lever bail are interengaged, and at least one of said shoulders being equipped with a pair of ears projecting into the path of the bail pivoted to said shoulder so as to limit the pivotal movement of said bail.

4. A container comprising a body; a cover; a lug projecting from said body; a lug projecting from said cover, said second-named lug being aligned with said first-named lug when said cover is in position on said body; a hasp bail pivoted to one of said lugs, said hasp bail having a continuous substantially straight portion and being adapted to serve as a handle when disengaged; and a lever bail having a continuous substantially straight portion and being adapted to serve as a handle when disengaged, said lever bail also having two parallel side portions disposed in a plane normal to said continuous substantially straight portion, each of said side portions pivotally engaging said first-named lug and being bent at an acute angle to provide a spring portion and an elbow portion constituting a socket for seating and releasably holding said hasp bail in over-center relationship; said first-named lug having an upper face serving as a seat for said cover when said hasp bail and said lever bail are interengaged, and at least one of said lugs being equipped with means projecting into the path of the bail pivoted to said lug so as to limit the pivotal movement of said bail.

5. A container comprising a body; a cover; a lug projecting from said body; a lug projecting from said cover; said second-named lug differing in length from said first-named lug and being aligned with said first-named lug when said cover is in position on said body; a hasp bail pivoted to the longer lug, said hasp bail having a continuous substantially straight portion and being adapted to serve as a handle when disengaged; and a lever bail having a continuous substantially straight portion and being adapted to serve as a handle when disengaged, said lever bail also having two parallel side portions disposed in a plane normal to said continuous substantially straight portion, each of said side portions pivotally engaging said first-named lug and being bent at an acute angle to provide a spring portion and an elbow portion constituting a socket for seating and releasably holding said hasp bail in over-center relationship; said first-named lug having an upper face serving as a seat for said cover when said hasp bail and said lever bail are interengaged; each of said lugs being equipped with ears projecting into the path of the bail pivoted to the lug so as to limit the pivotal movement of said bail.

6. A combined handle and latch system for a container body and cover combination, comprising (1) a pivoted hasp bail having a continuous substantially straight portion, said hasp bail adapted to serve as a handle when disengaged; and (2) a pivoted lever bail adapted to serve as a handle when disengaged, said lever bail having (a) a continuous substantially straight portion parallel to the continuous substantially straight portion of said hasp bail and having a length equalling at least the width of a human hand, said lever bail also having (b) two parallel side portions disposed in a plane normal to said continuous substantially straight portion, each of said side portions being bent to provide a spring portion doubled upon itself at an acute angle and pivotally engaging said container, and a socket portion for seating said hasp bail and adapted to abut against said container for limiting the movement of said lever bail so as to hold said hasp bail in over-center relationship when said lever bail and said hasp bail are interengaged.

7. A combined handle and latch system for a container body and cover combination, comprising (1) a pivoted hasp bail having a continuous substantially straight portion, said hasp bail adapted to serve as a handle when disengaged; and (2) a pivoted lever bail adapted to serve as a handle when disengaged, said lever bail having (a) a continuous substantially straight portion parallel to the continuous substantially straight portion of said hasp bail and having a length equalling at least the width of a human hand, said lever bail also having (b) two parallel side portions disposed in a plane normal to said continuous substantially straight portion, each of said side portions being bent to provide a spring portion doubled upon itself at an acute angle and pivotally engaging said container, an elbow portion constituting a socket for seating said hasp bail, and a straight portion adjacent said socket adapted to abut against said container for limiting the movement of said lever bail so as to hold said hasp bail in over-center relationship when said lever bail and said hasp bail are interengaged.

8. A combined handle and latch system for a container body and cover combination, comprising (1) a pivoted hasp bail having a continuous substantially straight portion, said hasp bail adapted to serve as a handle when disengaged; (2) a pivoted lever bail adapted to serve as a handle when disengaged, said lever bail having (a) a continuous substantially straight portion parallel to the continuous substantially straight portion of said hasp bail and having a length equalling at least the width of a human hand, said lever bail also having (b) two parallel side portions disposed in a plane normal to said continuous substantially straight portion, each of said side portions being bent to provide a spring portion doubled upon itself at an acute angle and pivotally engaging said container, and a socket portion for seating said hasp bail and adapted to abut against said container for limiting the movement of said lever bail so as to hold said hasp bail in over-center relationship when said lever bail and said hasp bail are interengaged; and (3) means projecting from said container into the path of said pivoted bails to limit their pivotal movement.

RONALD S. SENSEMAN.

REFERENCES CITED

The following references are of record in the file of this patent:

UNITED STATES PATENTS

| Number | Name | Date |
|---|---|---|
| 460,437 | Grove | Sept. 29, 1881 |
| 573,291 | Purinton | Dec. 15, 1896 |
| 706,705 | Tuell | Aug. 12, 1902 |
| 1,324,432 | Pfalzgraf | Dec. 9, 1919 |
| 1,350,713 | Ferdon | Aug. 24, 1920 |
| 2,300,201 | Brunhoff | Oct. 27, 1942 |